United States Patent
Beaulieu

(10) Patent No.: US 9,930,047 B2
(45) Date of Patent: Mar. 27, 2018

(54) TRANSPARENT OVERLAY AND HEADLESS BROWSER EXECUTION FOR WELCOME FLOW

(71) Applicant: McAfee, LLC, Santa Clara, CA (US)

(72) Inventor: Olivier Beaulieu, Montreal (CA)

(73) Assignee: McAfee, LLC, Santa Clara, CA (US)

( * ) Notice: Subject to any disclaimer, the term of this patent is extended or adjusted under 35 U.S.C. 154(b) by 93 days.

(21) Appl. No.: 14/864,521

(22) Filed: Sep. 24, 2015

(65) Prior Publication Data
US 2017/0093873 A1    Mar. 30, 2017

(51) Int. Cl.
H04L 29/06    (2006.01)

(52) U.S. Cl.
CPC .......... *H04L 63/102* (2013.01); *H04L 63/083* (2013.01)

(58) Field of Classification Search
CPC .................................................. H04L 63/083
USPC .......................................... 726/168; 713/168
See application file for complete search history.

(56) References Cited

U.S. PATENT DOCUMENTS

| | | | |
|---|---|---|---|
| 9,374,369 B2 * | 6/2016 | Mahaffey | H04L 63/0853 |
| 9,436,763 B1 * | 9/2016 | Gianos | G06F 17/3089 |
| 2013/0254855 A1 | 9/2013 | Walters et al. | |
| 2013/0311290 A1 | 11/2013 | Khwaja | |
| 2014/0171115 A1 * | 6/2014 | LaMarca | G06F 17/30 455/456.3 |
| 2014/0173708 A1 | 6/2014 | Garlick | |
| 2014/0189808 A1 | 7/2014 | Mahaffey et al. | |
| 2015/0134956 A1 | 5/2015 | Stachura et al. | |

OTHER PUBLICATIONS

The International Search Report and The Written Opinion of the International Searching Authority, dated Dec. 16, 2016, 15 pages.

* cited by examiner

*Primary Examiner* — Longbit Chai
(74) *Attorney, Agent, or Firm* — Blank Rome, LLP

(57) ABSTRACT

Associating a website with a credential manager includes identifying the launch of a first instance of a website to be associated with a credential manager in a web browser, displaying, along with the first instance of the website in the web browser, an overlay prompting a user to enter login data for the website, receiving, through the overlay in the web browser, the login data for the website, accessing a second instance of the website in a headless browser, utilizing the login data to attempt gain access to the second instance of the website, and in response to gaining access to the second instance of the website utilizing the login data, storing the login data in secure storage.

16 Claims, 6 Drawing Sheets

TRANSPARENT OVERLAY AND HEADLESS BROWSER EXECUTION FOR WELCOME FLOW

TECHNICAL FIELD

Embodiments described herein generally relate to website login, and more particularly to a transparent overlay and headless browser execution for a welcome flow.

BACKGROUND ART

Traditionally, authentication to a web service is accessed through a web portal. Commonly, the portal is accessed through the user directing a web browser to a web portal via a Uniform Resource Locator (URL), which is a representation of the web portal address, usually in a more human readable form.

Authentication for the web portal usually takes the approach of requiring the user to input a unique combination of a username and a password that identifies that specific user. The web portal usually prompts the user for submission of these credentials in a web-based form. The web-based forms present themselves under standards-based web browser renderable code. The credentials are usually input into the web browser, utilizing special policy requirements that determine the number and type of characters required to access that web service. Longer alphanumeric character strings usually provide stronger defense against brute force computational attacks.

However, the typical login process leaves open the possibility that a user may forget the password. Thus, it is preferable to allow the user to store the password in a way that it may be retrievable.

DESCRIPTION OF EMBODIMENTS

Figure 1:
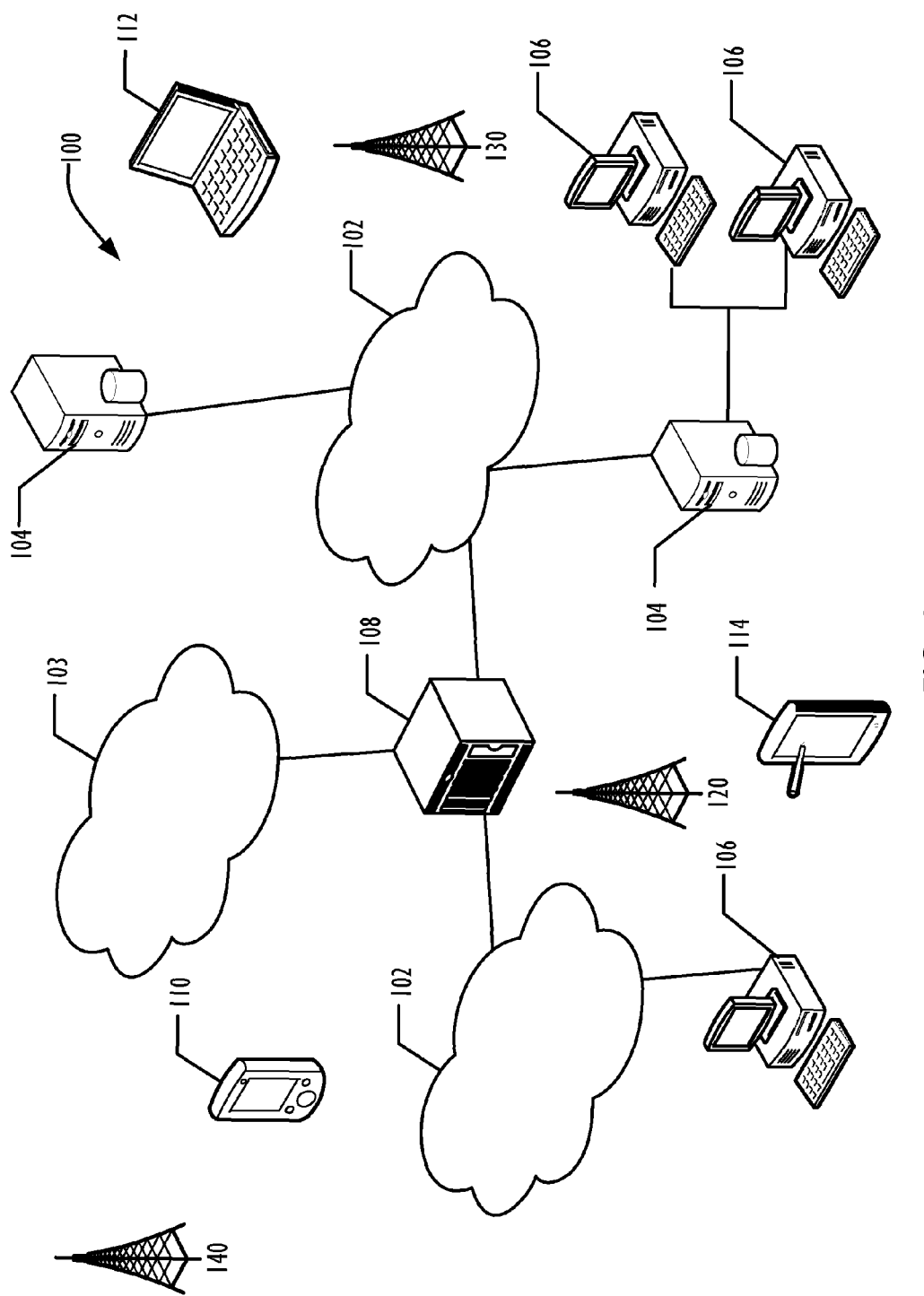
FIG. 1 is a diagram illustrating a network of programmable devices according to one or more embodiments.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "computer system" can refer to a single computer or a plurality of computers working together to perform the function described as being performed on or by a computer system.

As used herein, the term "network device" can refer to any computer system that is capable of communicating with another computer system across any type of network.

One of the more common modern methods of providing user credentials is via a web form presented in a web browser. Traditionally web browsers are applications that allow the user to view a representation of data presented in a specific standards-based syntax, the HyperText Markup Language (HTML). This allows users to view web sites for a variety of uses. The front end or "head" of a web browser is its user interface. The user interface is the main point at which the user provides input to the application, and is typically a graphical user interface (GUI). The rendering of the user interface is usually provided using common APIs provided by the display functionality of an operating system (OS) controlling the computer. This allows common appearances to be shared across applications executing under that OS, reducing code redundancy and bloat. Although described in terms of HTML and web pages, the techniques described herein can be used in any environment in which content may be injected into an object that provides a form for requesting credentials.

As used herein, a "headless" or non-rendered browser is an application that does not employ a GUI, thus, for example, a web page processed by the non-rendered browser is not rendered or displayed. The headless browser may contain the functionality to use a GUI, even though a particular invocation may not use the GUI. A non-rendered application may be invisible to the inexperienced user while executing in the system. The backend of the application remains intact, and still operable to process web site data identically as the rendered application. Headless browsers provide automated control of a web page in an environment similar to popular web browsers, but are typically executed via a command line interface or using network communication. Some headless browsers may be special purpose applications designed for such automated control purposes.

In one or more embodiments, a technique for providing a transparent overlay and headless browser execution for a welcome flow is described. In one or more embodiments, a user may wish to associate a particular website login with a password to be used in connection with a credential manager. The user may either select the website by visiting the website itself, or through a credential manager application. A modified version of the website is presented by including an overlay over the website, which prompts the user to enter password data into the overlay. Thus, instead of the password data being transmitted to the website, it is captured by a credential manager application. Then, the website is accessed in a headless browser and the credential manager application uses the login information to log into the website within the headless browser. If the login is successful, then the user is welcomed to the website in the regular web browser.

In one or more embodiments, the credential manager application may provide an interface within which a user may select from a list of websites for which credentials may be provided by the credentialmanager. In one or more embodiments, the list of websites included in the interface may be managed by the credential manager application. In one or more embodiments, the initial list may be provided by a credential manager server, or may be obtained from an external API. Test accounts may be generated for each of the candidate websites. In one or more embodiments, the candidate websites may be continuously tested to ensure that automated login requirements still work. For example, the candidate websites may be tested using a name and password, but may be modified to require additional data. Such a change would result in an error. If an error is detected, then the website is removed from the user interface until a developer can modify the script that causes the overlay to be displayed on the modified version of the website.

Referring to the figures, FIG. 1 an example infrastructure 100 in which embodiments may be implemented is illustrated schematically. Infrastructure 100 contains computer networks 102. Computer networks 102 may include many different types of computer networks available today, such as the Internet, a corporate network, or a Local Area Network (LAN). Each of these networks can contain wired or wireless programmable devices and operate using any number of network protocols (e.g., TCP/IP). Networks 102 may be connected to gateways and routers (represented by 108), end user computers 106, and computer servers 104. Infrastructure 100 also includes cellular network 103 for use with mobile communication devices. Mobile cellular networks support mobile phones and many other types of mobile devices. Mobile devices in the infrastructure 100 are illustrated as mobile phones 110, laptops 112, and tablets 114. A mobile device such as mobile phone 110 may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers 108. In addition, the mobile devices 110, 112, and 114 may interact with non-mobile devices such as computers 104 and 106 for desired services. The functionality of the gateway device 108 may be implemented in any device or combination of devices illustrated in FIG. 1; however, most commonly is implemented in a firewall or intrusion protection system in a gateway or router.

Figure 2:
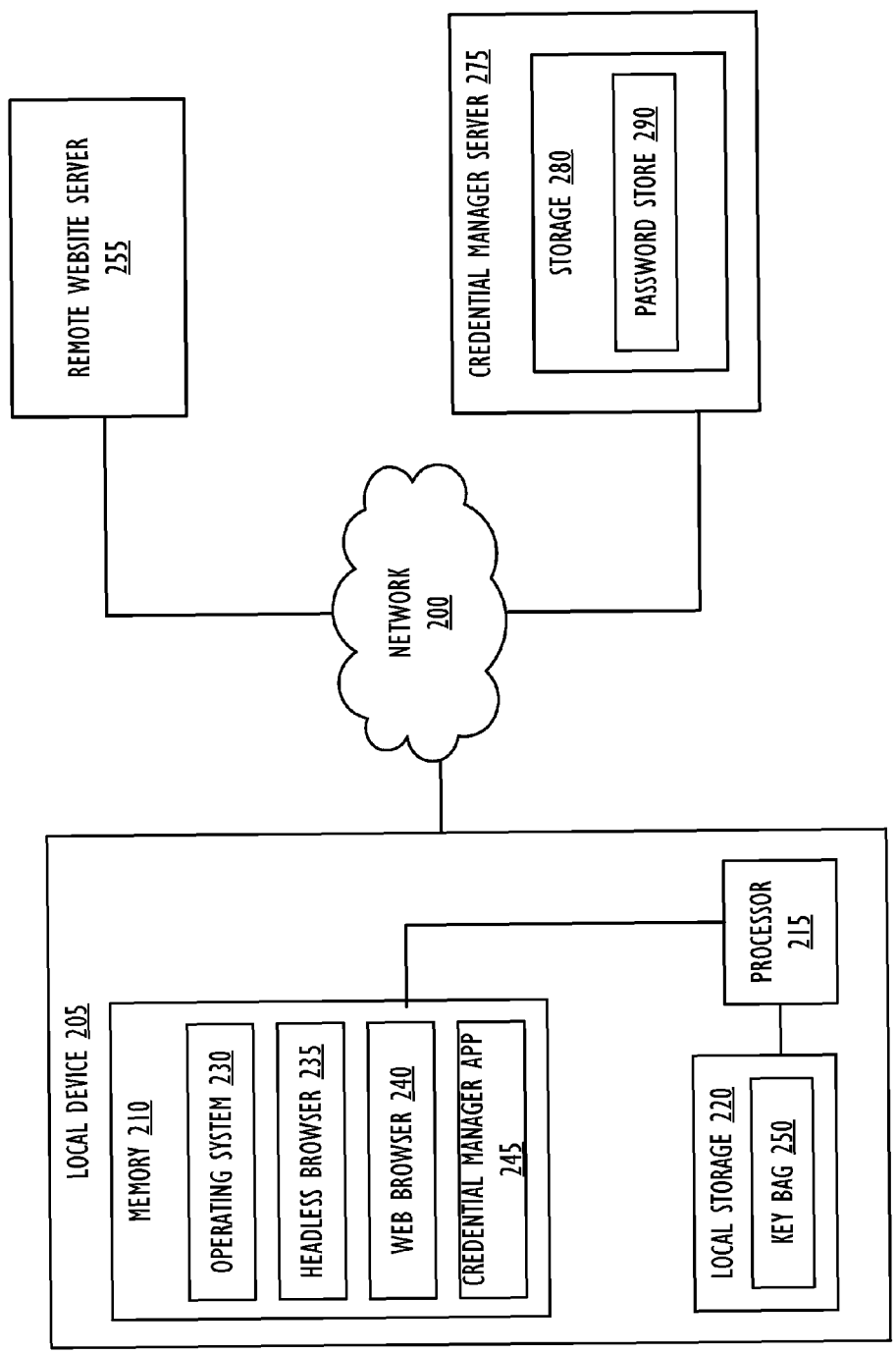
FIG. 2 is a diagram illustrating a system for providing a transparent overlay and headless browser execution according to one or more embodiments.

FIG. 2 is a diagram illustrating a system for providing a transparent overlay and headless browser execution according to one or more embodiments. FIG. 2 includes three devices, including Local Device 205, Server 255, and Server 275, connected across Network 200. Network 200 may be any type of computer network, such as a LAN or a corporate network. For example, Network 200 may include a subset of the devices included in larger network 102 or 103. It should be understood that the components are depicted in FIG. 2 as an example embodiment, and some or all of the various components may be located, for example, within a single server, multiple servers, network storage, or other network devices.

Local Device 205 includes a processor core 215. Processor core 215 may be the core for any type of processor, such as a microprocessor, an embedded processor, a digital signal processor (DSP), a network processor, or other device to execute code. Although only one processor core is illustrated in each trusted device in FIG. 2, a processing element may alternatively include more than one of the processor core 215 illustrated in FIG. 2. Processor core 215 may each be a single-threaded core or, for at least one embodiment, processor core 215 may be multithreaded in that it may include more than one hardware thread context (or "logical processor") per core.

Local Device 205 also includes a memory coupled to the processor. Memory 210 may be any of a wide variety of memories (including various layers of memory hierarchy) as are known or otherwise available to those of skill in the art. Program code, or instructions, such as the operating system 230, a headless browser 235, a web browser 240, and a credential manager application 245 may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible, non-transitory medium through which the program code may pass, such as antennas, optical fibers, communications interfaces, etc. Program code may be transmitted in the form of packets, serial data, parallel data, etc., and may be used in a compressed or encrypted format. The processor core 215 follow a program sequence of instructions indicated by the code. In this manner, processor core 215 is transformed during execution of the code.

Although not illustrated in FIG. 2, a processing element may include other elements on chip with the processor core 215. For example, a processing element may include memory control logic along with the processor cores. The processing element may include I/O control logic and/or may include I/O control logic integrated with memory control logic. The processing element may also include one or more caches.

Website server 255 may provide a web service that requires or provides a user login. Credential manager server 275 may provide remote authentication of a user at local device 205. The credential manager server 275 may be used to securely store login data. The credential manager server 275 may also include a storage, which may include a password store 290. In one or more embodiments, the password store may contain password data for websites, which a user of the local device 205 associates with a master password through the use of the credential manager application 245.

Although not illustrated in FIG. 2, a processing element may include other elements on chip with the processor core 215. For example, a processing element may include memory control logic along with the processor cores. The processing element may include I/O control logic and/or may include I/O control logic integrated with memory control logic. The processing element may also include one or more caches.

In one or more embodiments, the credential manager application 245 may provide an interface through the web browser 240 so that a user may enter password information or a website. The credential manager application 245 may verify the validity of the password information by using the password information in an instance of the website opened in a headless browser 235. Upon verifying the validity of the password, the password may be stored, for example, in a password store 290 on a credential manager server 275 in a data structure associated with the master password of the user. In one or more embodiments, the master password may be stored, for example, in a key bag 250 in local storage 220.

In one or more embodiments, the credential manager application 245 may provide a user interface for a user to select websites for which login information may be provided by the credential manager for the user. Thus, a user may access a number of websites using only the master password. In one or more embodiments, the credential manager application 245 receives candidate websites based on websites for which the login requirements are known. The list of candidate websites may be received, for example, from a credential manager server 275, or through the use of an external API. The credential manager application 245 may generate test accounts for each suggested website and periodically, or occasionally, login to the candidate websites using the test accounts. In one or more embodiments, the credential manager application 245 may log into the candidate websites using the headless browser 235. If it is determined that the test account cannot successfully access the website, then the login requirements may have changed, and the website is removed from the candidate list until a developer revises the code for the script for that website.

Figure 3:
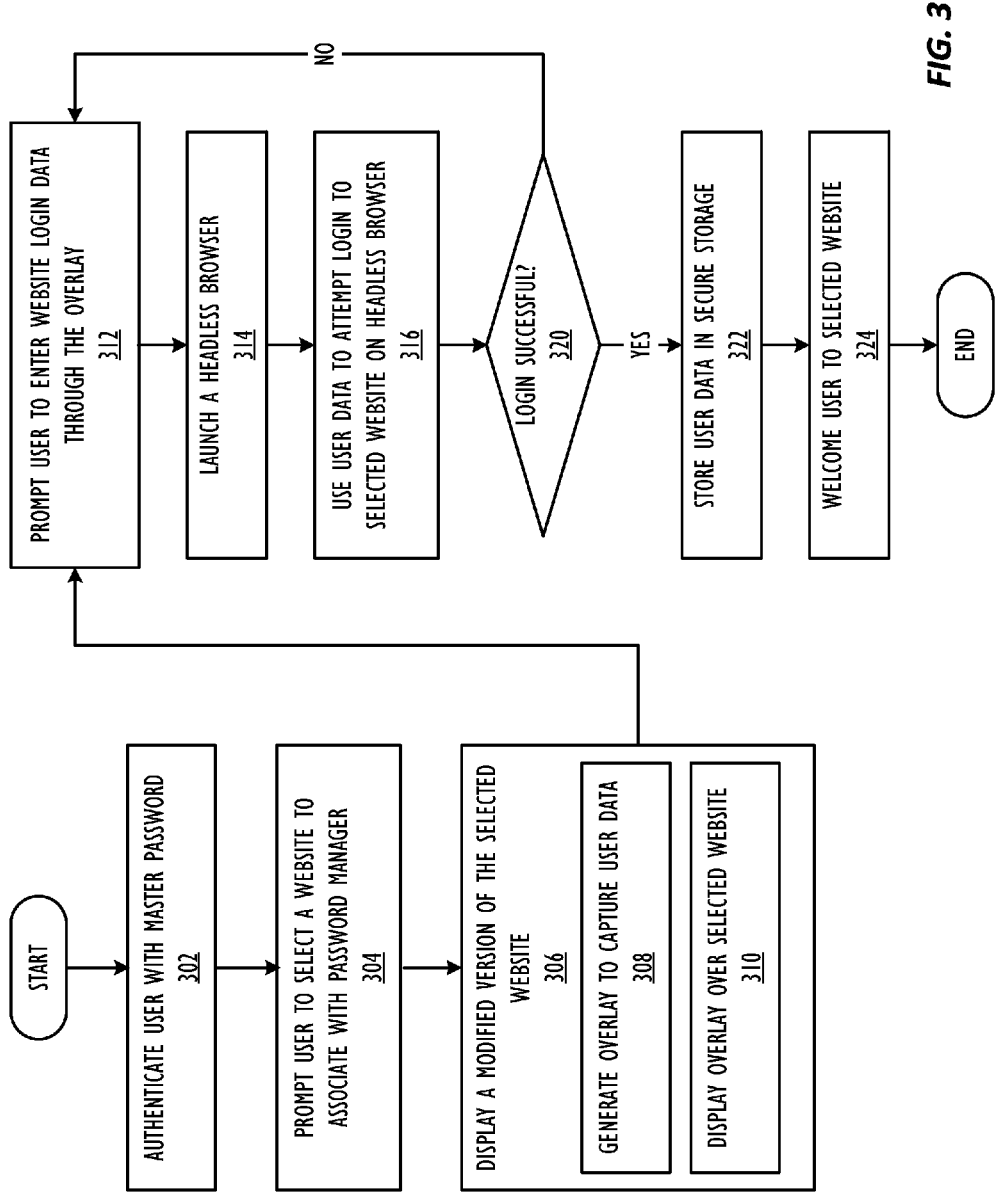
FIG. 3 is a flowchart illustrating a technique for associating a website with a password, according to one or more embodiments.

FIG. 3 is a flowchart illustrating a technique for associating a website with a credential manager, according to one or more embodiments.

The flowchart begins at 302, and a user is authenticated with a master password. In one or more embodiments, the master password may be associated with a user's account, which allows the user to use a single password to log into a number of locations and devices.

The flowchart continues at 204 and a user is prompted to select a website to associate with the credential manager. In one or more embodiments, the credential manager application 245 may provide a user interface that includes a list of one or more candidate websites from which the user may select to associate with the credential manager. In one or more embodiments of the invention, the user may visit a candidate website and select from the website to associate login information for the website with the credential manager.

The flowchart continues at 306, and a modified version of the selected website is displayed. The modified website may include a form different from the login form of the website. In one or more embodiments, the new login form may appear the same as the login form for the website, but may be associated with the credential manager server 275, rather than the remote website server 255, for example. In one or more embodiments, at 308, the credential manager application 245 may generate a script that causes a login field to become visible on the selected website. As an example, a script may be injected within the website. In one or more embodiments, the script may be injected, for example, using browser extensions, browser "add-ons," browser helper objects (BHOs), and the like. At 310, the overlay may be displayed over the selected website. For example, a new login form may be depicted while the selected website is blocked out or shaded out in the background.

The flowchart continues at 312, and the user is prompted to enter login information for the selected website in to the new form. Once the login information is received, the credential manager application 245 may launch the headless browser 235 and thereby access a new instance of the website.

The flowchart continues at 316, and the credential manager application 245 attempts to log into the instance of the website in the headless browser 240 using the login information provided by the user in the form on the modified version of the website displayed in the web browser 240. At 320, if it is determined that the user's login information was not successful in the headless browser, then the flowchart returns to 312 and the user is prompted in the web browser 240 to repeat the process.

If at 320 it is determined that the user login information was successful in accessing the user's account in the selected website, then the flowchart continues at 322 and the user login data is stored, for example, in the password store 290, and the user is welcomed to the selected website in the web browser 240.

Figure 4:
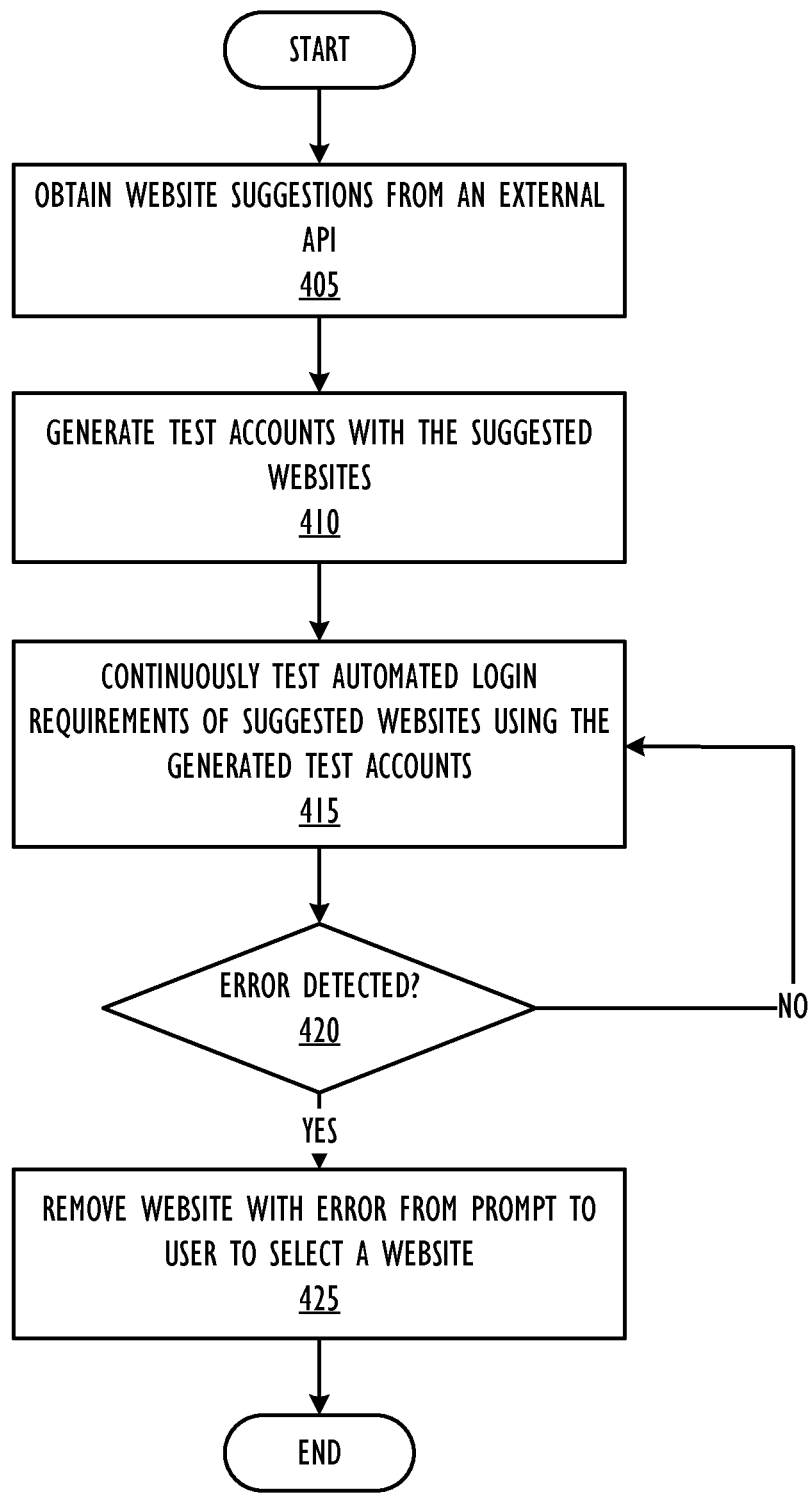
FIG. 4 is a flowchart illustrating a technique for generating a user interface for providing a transparent layer overlay, according to one or more embodiments.

FIG. 4 is a flowchart illustrating a technique for generating a user interface for providing a transparent layer overlay, according to one or more embodiments. In one or more embodiments, the credential manager application 245 may manage a list of candidate websites from which a user may select to associate with the credential manager. Alternatively, or additionally, the various steps of FIG. 4 may be centrally managed, such as by the credential manager server, and pushed out to local device 205.

The flowchart begins at 405, and candidate websites are obtained. In one or more embodiments, the candidate websites may be obtained from a credential manager server 275. In one or more embodiments, the candidate websites include websites for which the login requirements are known.

The flowchart continues at 410 and test accounts are generated for each of the candidate websites. In one or more embodiments, the test accounts are generated based on the required login information for each candidate website. The test login information may be stored, for example, in a password store 290 in a storage area 280 of the credential manager server 275.

The flowchart continues at 415, and the login requirements for the candidate websites are periodically tested to determine if the test login information allows for successful login. In one or more embodiments, the websites may be tested occasionally, on a fixed schedule, on demand, or at any other time. In one or more embodiments, testing the login requirements allows the manager to determine if login requirements have changed.

At 420, a determination is made regarding whether an error has been detected. If an error is not detected, the websites continue to be tested periodically or occasionally at 415. If at 420 an error is detected, then the flowchart continues at 425 and the website is removed from the list of candidate websites presented to the user in the user interface provided by the credential manager application 245. If an error is detected, then the website is removed until a developer can modify the script that causes the overlay to be displayed on the modified version of the website.

Figure 5:
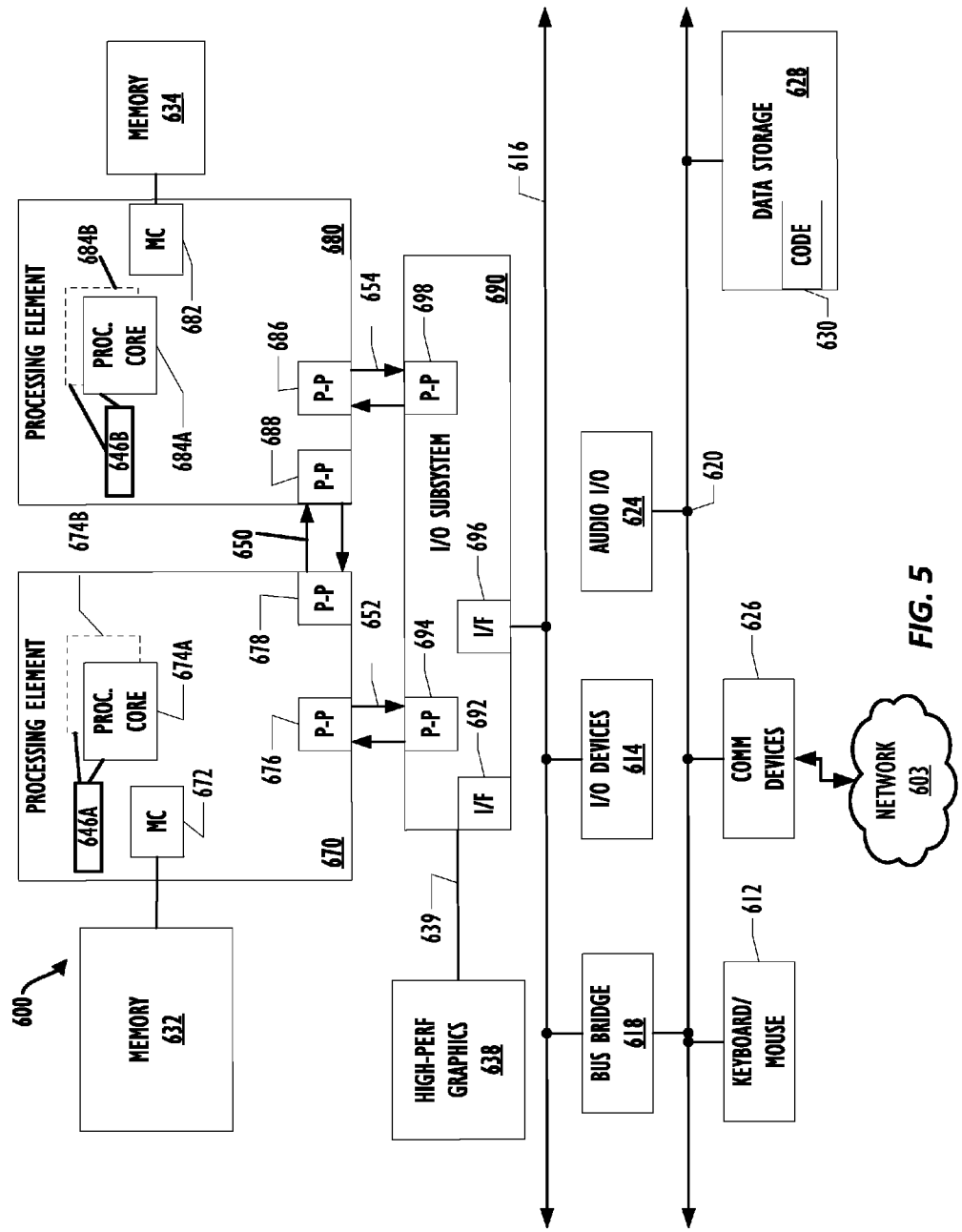
FIG. 5 is a diagram illustrating a computing device for use with techniques described herein according to one embodiment.
Figure 6:
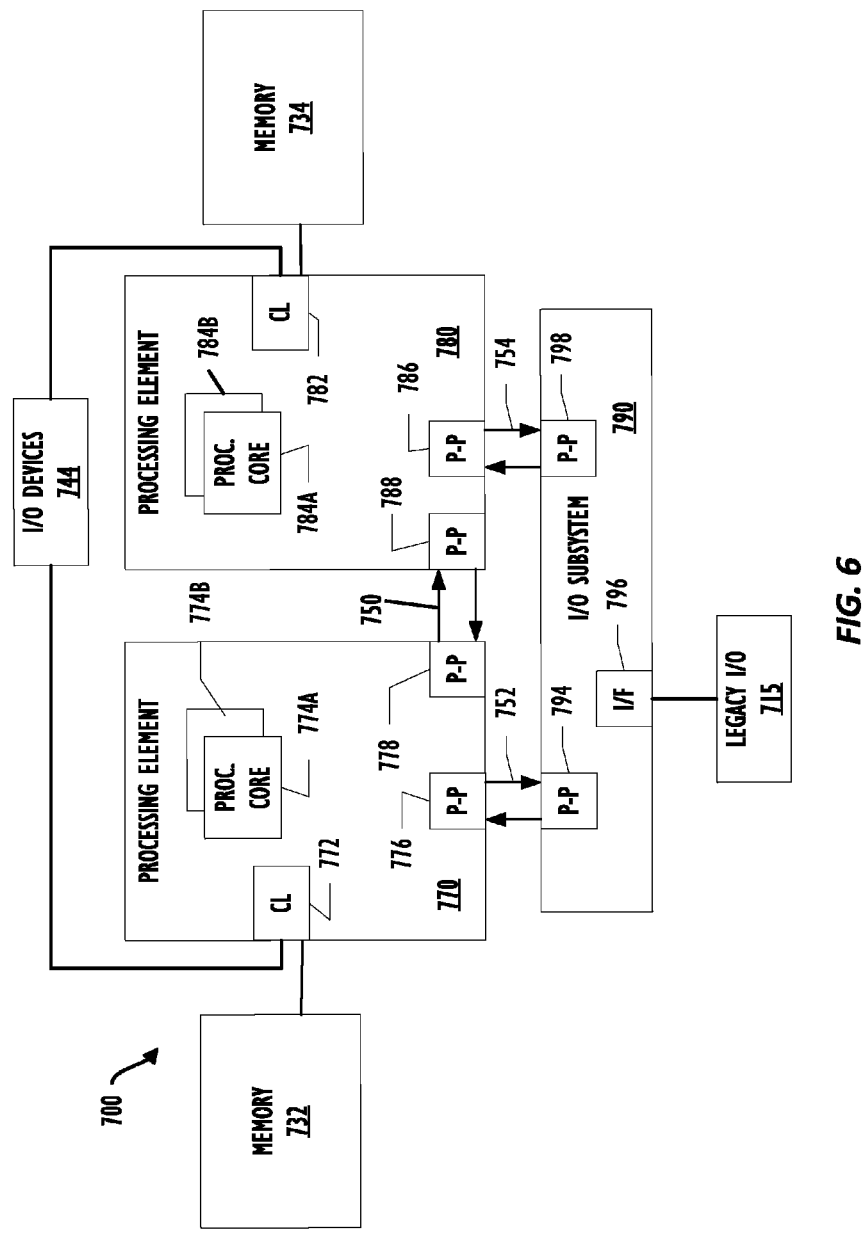
FIG. 6 is a block diagram illustrating a computing device for use with techniques described herein according to another embodiment.

Referring now to FIG. 5, a block diagram illustrates a programmable device 600 that may be used within a computer device, such as local device 205, server 255275, and server 275 in accordance with one or more embodiments. The programmable device 600 illustrated in FIG. 6 is a multiprocessor programmable device that includes a first processing element 670 and a second processing element 680. While two processing elements 670 and 680 are shown, an embodiment of programmable device 600 may also include only one such processing element.

Programmable device 600 is illustrated as a point-to-point interconnect system, in which the first processing element 670 and second processing element 680 are coupled via a point-to-point interconnect 650. Any or all of the interconnects illustrated in FIG. 6 may be implemented as a multi-drop bus rather than point-to-point interconnects.

As illustrated in FIG. 6, each of processing elements 670 and 680 may be multicore processors, including first and second processor cores (i.e., processor cores 674a and 674b and processor cores 684a and 684b). Such cores 674a, 674b, 684a, 684b may be configured to execute instruction code in a manner similar to that discussed above in connection with FIGS. 1-4. However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646a, 646b may store data (e.g., instructions) that are utilized by one or more components of the processing element, such as the cores 674a, 674b and 684a, 684b, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof.

While FIG. 5 illustrates a programmable device with two processing elements 670, 680 for clarity of the drawing, the scope of the present invention is not so limited and any number of processing elements may be present. Alternatively, one or more of processing elements 670, 680 may be an element other than a processor, such as an graphics processing unit (GPU), a digital signal processing (DSP) unit, a field programmable gate array, or any other programmable processing element. Processing element 680 may be heterogeneous or asymmetric to processing element 670. There may be a variety of differences between processing elements 670, 680 in terms of a spectrum of metrics of merit including architectural, microarchitectural, thermal, power consumption characteristics, and the like. These differences may effectively manifest themselves as asymmetry and heterogeneity amongst processing elements 670, 680. In some embodiments, the various processing elements 670, 680 may reside in the same die package.

First processing element 670 may further include memory controller logic (MC) 672 and point-to-point (P-P) interconnects 676 and 678. Similarly, second processing element 680 may include a MC 682 and P-P interconnects 686 and 688. As illustrated in FIG. 6, MCs 672 and 682 couple processing elements 670, 680 to respective memories, namely a memory 632 and a memory 634, which may be portions of main memory locally attached to the respective processors. While MC logic 672 and 682 is illustrated as integrated into processing elements 670, 680, in some embodiments the memory controller logic may be discrete logic outside processing elements 670, 680 rather than integrated therein.

Processing element 670 and processing element 680 may be coupled to an I/O subsystem 690 via respective P-P interconnects 676 and 686 through links 652 and 654. As illustrated in FIG. 6, I/O subsystem 690 includes P-P interconnects 694 and 698. Furthermore, I/O subsystem 690 includes an interface 692 to couple I/O subsystem 690 with a high performance graphics engine 638. In one embodiment, a bus (not shown) may be used to couple graphics engine 638 to I/O subsystem 690. Alternately, a point-to-point interconnect 639 may couple these components.

In turn, I/O subsystem 690 may be coupled to a first link 616 via an interface 696. In one embodiment, first link 616 may be a Peripheral Component Interconnect (PCI) bus, or a bus such as a PCI Express bus or another I/O interconnect bus, although the scope of the present invention is not so limited.

As illustrated in FIG. 5, various I/O devices 614, 624 may be coupled to first link 616, along with a bridge 618, which may couple first link 616 to a second link 620. In one embodiment, second link 620 may be a low pin count (LPC) bus. Various devices may be coupled to second link 620 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second bus 620.

Note that other embodiments are contemplated. For example, instead of the point-to-point architecture of FIG. 5, a system may implement a multi-drop bus or another such communication topology. Although links 616 and 620 are illustrated as busses in FIG. 5, any desired type of link may be used. Also, the elements of FIG. 5 may alternatively be partitioned using more or fewer integrated chips than illustrated in FIG. 5.

Referring now to FIG. 6, a block diagram illustrates a programmable device 700 according to another embodiment. Certain aspects of FIG. 5 have been omitted from FIG. 6 in order to avoid obscuring other aspects of FIG. 6.

FIG. 6 illustrates that processing elements 770, 780 may include integrated memory and I/O control logic ("CL") 772 and 782, respectively. In some embodiments, the 772, 782 may include memory control logic (MC) such as that described above in connection with FIG. 6. In addition, CL 772, 782 may also include I/O control logic. FIG. 6 illustrates that not only may the memories 732, 734 be coupled to the 772, 782, but also that I/O devices 744 may also be coupled to the control logic 772, 782. Legacy I/O devices 715 may be coupled to the I/O subsystem 790 by interface 796. Each processing element 770, 780 may include multiple processor cores, illustrated in FIG. 6 as processor cores 774A, 774B, 784A, and 784B. As illustrated in FIG. 7, I/O subsystem 790 includes P-P interconnects 794 and 798 that connect to P-P interconnects 776 and 786 of the processing elements 770 and 780 with links 752 and 754. Processing elements 770 and 780 may also be interconnected by link 750 and interconnects 778 and 788, respectively.

The programmable devices depicted in FIGS. 5 and 6 are schematic illustrations of embodiments of programmable devices that may be utilized to implement various embodiments discussed herein. Various components of the programmable devices depicted in FIGS. 5 and 6 may be combined in a system-on-a-chip (SoC) architecture.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

The following examples pertain to further embodiments.

Example 1 is a machine readable medium on which instructions are stored, comprising instructions that when executed cause a machine to: identify a launch of a first instance of a website to be associated with a credential manager in a web browser; display, along with the first instance of the website in the web browser, an overlay prompting a user to enter login data for the website; receive, through the overlay in the web browser, the login data for the website; access a second instance of the website in a headless browser; utilize the login data to attempt gain access to the second instance of the website; transfer access from the headless browser to the web browser; and in response to gaining access to the second instance of the website utilizing the login data, store the login data in secure storage.

In Example 2 the subject matter of Example 1 optionally includes wherein the instructions that cause a machine to identify a launch of a first instance of a website to be associated with a credential manager in a web browser comprise instructions that when executed cause the machine to: display a user interface comprising one or more candidate websites; and receive a selection of the website.

In Example 3 the subject matter of Example 2 optionally includes further comprising instructions that when executed further cause the machine to: generate test login data for a plurality of the one or more candidate websites; test automated login requirements of the one or more candidate websites by automatically logging into each of the candidate websites using the test login data; and in response to detecting a failed automatic login of one of the one or more candidate websites, remove the one of the one or more candidate websites from the one or more candidate websites.

In Example 4 the subject matter of Examples 2-3 optionally includes wherein the instructions that cause a machine to display a user interface comprising one or more candidate websites comprise instructions that when executed cause the machine to: determine a location of the user; and select the one or more candidate websites based on the location of the user.

In Example 5 the subject matter of Examples 1-2 optionally includes further comprising instructions that when executed further cause the machine to: in response to failing access to the second instance of the website utilizing the login data: relay an indication of an unsuccessful login to the overlay in the web browser; prompt, through the overlay in the web browser, the user to enter a different login data for the website; and utilize the different login data to attempt gain access to the second instance of the website in the headless browser.

In Example 6 the subject matter of Examples 1-2 optionally includes wherein the instructions that cause a machine to access a second instance of the website in a headless browser comprise instructions that when executed cause the machine to: execute the headless browser in a protected environment.

In Example 7 the subject matter of Examples 1-2 optionally includes wherein the secure storage is a remote secure storage associated with an account for the user of the credential manager.

Example 8 is a system, comprising: one or more processors; and a memory, coupled to the one or more processors, on which are stored instructions, comprising instructions that when executed cause at least some of the one or more processors to: identify a launch of a first instance of a website to be associated with a credential manager in a web browser; display, along with the first instance of the website in the web browser, an overlay prompting a user to enter login data for the website; receive, through the overlay in the web browser, the login data for the website; access a second instance of the website in a headless browser; utilize the login data to attempt gain access to the second instance of the website; transfer access from the headless browser to the web browser; and in response to gaining access to the second instance of the website utilizing the login data, store the login data in secure storage.

In Example 9 the subject matter of Example 8 optionally includes wherein the instructions that cause at least some of the one or more processors to identify a launch of a first instance of a website to be associated with a credential manager in a web browser comprise instructions that when executed cause at least some of the one or more processors to: display a user interface comprising one or more candidate websites; and receive a selection of the website.

In Example 10 the subject matter of Example 9 optionally includes wherein the instructions further comprise instructions that when executed cause at least some of the one or more processors to: generate test login data for a plurality of the one or more candidate websites; test automated login requirements of the one or more candidate websites by automatically logging into each of the candidate websites using the test login data; and in response to detecting a failed automatic login of one of the one or more candidate websites, remove the one of the one or more candidate websites from the one or more candidate websites.

In Example 11 the subject matter of Example 9 optionally includes wherein the instructions that cause a machine to display a user interface comprising one or more candidate websites comprise instructions that when executed cause at least some of the one or more processors to: determine a location of the user; and select the one or more candidate websites based on the location of the user.

In Example 12 the subject matter of Examples 8-9 optionally includes wherein the instructions further comprise instructions that when executed further cause at least some of the one or more processors, in response to failing access to the second instance of the website utilizing the login data, to: relay an indication of the unsuccessful login to the overlay in the web browser; prompt, through the overlay in the web browser, the user to enter a different login data for the website, and utilize the different login data to attempt gain access to the second instance of the website in the headless browser.

In Example 13 the subject matter of Examples 8-9 optionally includes wherein the instructions that cause at least some of the processors to access a second instance of the website in a headless browser comprise instructions that when executed cause at least some of the processors to: execute the headless browser in a protected environment.

Example 14 is a method comprising: identifying a launch of a first instance of a website to be associated with a credential manager in a web browser; displaying, along with the first instance of the website in the web browser, an overlay prompting a user to enter login data for the website; receiving, through the overlay in the web browser, the login data for the website; accessing a second instance of the website in a headless browser; utilizing the login data to attempt gain access to the second instance of the website; and in response to gaining access to the second instance of the website utilizing the login data, storing the login data in secure storage.

In Example 15 the subject matter of Example 14 optionally includes wherein identifying a launch of a first instance of a website to be associated with a credential manager in a web browser further comprises: displaying a user interface comprising one or more candidate websites; and receiving a selection of the website.

In Example 16 the subject matter of Example 15 optionally includes further comprising: generating test login data for a plurality of the one or more candidate websites; testing automated login requirements of the one or more candidate websites by automatically logging into each of the candidate websites using the test login data; and removing the one of the one or more candidate websites from the one or more candidate websites, in response to detecting a failed automatic login of one of the one or more candidate websites.

In Example 17 the subject matter of Example 15 optionally includes wherein displaying a user interface comprising one or more candidate websites further comprises: determining a location of the user; and selecting the one or more candidate websites based on the location of the user.

In Example 18 the subject matter of Example 14 optionally includes further comprising, in response to failing access to the second instance of the website utilizing the login data: relaying an indication of an unsuccessful login to the overlay in the web browser; prompting, through the overlay in the web browser, the user to enter a different login data for the website; and utilizing the different login data to attempt gain access to the second instance of the website in the headless browser.

In Example 19 the subject matter of Example 14 optionally includes wherein accessing a second instance of the website in a headless browser further comprises: executing the headless browser in a protected environment.

Example 20 is a system for secure login, comprising: one or more processors; and a memory, coupled to the one or more processors, on which are instructions are stored which, when executed by the one or more processors cause the one or more processors to: obtain website suggestions for automated login; generate test accounts for each of one or more of the website suggestions; test automated login requirements of the one or more of the website suggestions using the generated test accounts; and generate a list of candidate websites based on results from the tested automated login requirements.

In Example 21 the subject matter of Example 20 optionally includes wherein the instructions to test automated login requirements of the one or more of the website suggestions further comprise instructions that further cause the one or more processors to: access an instance of one of the list of candidate websites in a headless browser; and utilize login data for a generated test account associated with the one of the list of candidate websites to attempt gain access to the one of the list of candidate websites.

In Example 22 the subject matter of Example 20 optionally includes wherein the instructions to generate a list of candidate websites further comprises instructions that further cause the one or more processors to: in response to detecting a failed automatic login of one of the list of candidate websites, removing the one of list of candidate websites from the list of candidate websites.

Example 23 is a programmable device, comprising: means for identifying a launch of a first instance of a website to be associated with a credential manager in a web browser; means for displaying, along with the first instance of the website in the web browser, an overlay prompting a user to enter login data for the website; means for receiving, through the overlay in the web browser, the login data for the website; means for accessing a second instance of the website in a headless browser; means for utilizing the login data to attempt gain access to the second instance of the website; means for transferring access from the headless browser to the web browser; and means for storing the login data in secure storage, in response to gaining access to the second instance of the website utilizing the login data.

In Example 24 the subject matter of Example 23 optionally includes wherein means for identifying a launch of a first instance of a website to be associated with a credential manager in a web browser comprises: means for displaying a user interface comprising one or more candidate websites; and means for receiving a selection of the website.

In Example 25 the subject matter of Example 2 optionally includes further comprising: means for generating test login data for a plurality of the one or more candidate websites; means for testing automated login requirements of the one or more candidate websites by automatically logging into each of the candidate websites using the test login data; and means for removing the one of the one or more candidate websites from the one or more candidate websites, in response to detecting a failed automatic login of one of the one or more candidate websites.

In Example 26 the subject matter of Examples 24-25 optionally includes wherein the means for displaying a user interface comprising one or more candidate websites comprises: means for determining a location of the user; and means for selecting the one or more candidate websites based on the location of the user.

In Example 27 the subject matter of Examples 23-24 optionally includes further comprising, in response to failing access to the second instance of the website utilizing the login data: means for relaying an indication of an unsuccessful login to the overlay in the web browser; means for prompting, through the overlay in the web browser, the user to enter a different login data for the website; and means for utilizing the different login data to attempt gain access to the second instance of the website in the headless browser.

In Example 28 the subject matter of Examples 23-24 optionally includes wherein the means for accessing a second instance of the website in a headless browser comprise: means for executing the headless browser in a protected environment.

In Example 29 the subject matter of Examples 23-24 optionally includes wherein the secure storage is a remote secure storage associated with an account for the user of the credential manager.

It is to be understood that the above description is intended to be illustrative, and not restrictive. For example, the above-described embodiments may be used in combination with each other. As another example, the above-described flowcharts include a series of actions, which may not be performed in the particular order depicted in the drawings. Rather, the various actions may occur in a different order, or even simultaneously. In addition, in some embodiments, some actions may not be performed. Many other embodiment will be apparent to those of skill in the art upon reviewing the above description. The scope of the invention should therefore should be determined with reference to the appended claims, along with the full scope of equivalents to which such claims are entitled.

What is claimed is:

1. A non-transitory machine readable medium on which instructions are stored, comprising instructions that when executed cause a machine to:
   identify a launch of a first instance of a website to be associated with a credential manager in a web browser;
   display, along with the first instance of the website in the web browser, an overlay prompting a user to enter login data for the website;
   receive, through the overlay in the web browser, the login data for the website;
   access a second instance of the website in a headless browser;
   utilize the login data to attempt to gain access to the second instance of the website;
   in response to failing access to the second instance of the website utilizing the login data:
      relay an indication of an unsuccessful login to the overlay in the web browser,
      prompt, through the overlay in the web browser, the user to enter a different login data for the website, and
      utilize the different login data to attempt to gain access to the second instance of the website in the headless browser;
   transfer access from the headless browser to the web browser; and
   in response to gaining access to the second instance of the website utilizing the login data, store the login data in secure storage.

2. The machine readable medium of claim 1, wherein the instructions that cause a machine to identify a launch of a first instance of a website to be associated with a credential manager in a web browser comprise instructions that when executed cause the machine to:
   display a user interface comprising one or more candidate websites; and
   receive a selection of the website.

3. The machine readable medium of claim 2, further comprising instructions that when executed further cause the machine to:
   generate test login data for a plurality of the one or more candidate websites;
   test automated login requirements of the one or more candidate websites by automatically logging into each of the candidate websites using the test login data; and
   in response to detecting a failed automatic login of one of the one or more candidate websites, remove the one of the one or more candidate websites from the one or more candidate websites.

4. The machine readable medium of claim 2, wherein the instructions that cause a machine to display a user interface comprising one or more candidate websites comprise instructions that when executed cause the machine to:
   determine a location of the user; and
   select the one or more candidate websites based on the location of the user.

5. The machine readable medium of claim 1, wherein the instructions that cause a machine to access a second instance of the website in a headless browser comprise instructions that when executed cause the machine to:
   execute the headless browser in a protected environment.

6. The machine readable medium of claim 1, wherein the secure storage is a remote secure storage associated with an account for the user of the credential manager.

7. A system, comprising:
   one or more hardware processors; and
   a memory, coupled to the one or more processors, on which are stored instructions, comprising instructions that when executed cause at least some of the one or more processors to:
      identify a launch of a first instance of a website to be associated with a credential manager in a web browser;
      display, along with the first instance of the web site in the web browser, an overlay prompting a user to enter login data for the website;
      receive, through the overlay in the web browser, the login data for the website;
      access a second instance of the website in a headless browser;
      utilize the login data to attempt to gain access to the second instance of the website;
      in response to failing access to the second instance of the website utilize the login data:
         relay an indication of an unsuccessful login to the overlay in the web browser,
         prompt, through the overlay in the web browser, the user to enter a different login data for the website, and
         utilize the different login data to attempt to gain access to the second instance of the website in the headless browser;
      transfer access from the headless browser to the web browser; and
      in response to gaining access to the second instance of the website utilizing the login data, store the login data in secure storage.

8. The system of claim 7, wherein the instructions that cause at least some of the one or more processors to identify a launch of a first instance of a website to be associated with a credential manager in a web browser comprise instructions that when executed cause at least some of the one or more processors to:
   display a user interface comprising one or more candidate websites; and
   receive a selection of the website.

9. The system of claim 8, wherein the instructions further comprise instructions that when executed cause at least some of the one or more processors to:
   generate test login data for a plurality of the one or more candidate websites;
   test automated login requirements of the one or more candidate websites by automatically logging into each of the candidate websites using the test login data; and
   in response to detecting a failed automatic login of one of the one or more candidate websites, remove the one of the one or more candidate websites from the one or more candidate websites.

10. The system of claim 8, wherein the instructions that cause a machine to display a user interface comprising one or more candidate websites comprise instructions that when executed cause at least some of the one or more processors to:
    determine a location of the user; and select the one or more candidate websites based on the location of the user.

11. The system of claim 7, wherein the instructions that cause at least some of the processors to access a second instance of the website in a headless browser comprise instructions that when executed cause at least some of the processors to:
execute the headless browser in a protected environment.

12. A method comprising:
identifying a launch of a first instance of a website to be associated with a credential manager in a web browser;
displaying, along with the first instance of the website in the web browser, an overlay prompting a user to enter login data for the website;
receiving, through the overlay in the web browser, the login data for the website;
accessing a second instance of the website in a headless browser;
utilizing the login data to attempt to gain access to the second instance of the website;
in response to failing access to the second instance of the website utilizing the login data:
relay an indication of an unsuccessful login to the overlay in the web browser,
prompt, through the overlay in the web browser, the user to enter a different login data for the website, and
utilize the different login data to attempt to gain access to the second instance of the website in the headless browser; and in response to gaining access to the second instance of the website utilizing the login data, storing the login data in secure storage.

13. The method of claim 12, wherein identifying a launch of a first instance of a website to be associated with a credential manager in a web browser further comprises:
displaying a user interface comprising one or more candidate websites; and
receiving a selection of the website.

14. The method of claim 13, further comprising:
generating test login data for a plurality of the one or more candidate websites;
testing automated login requirements of the one or more candidate websites by automatically logging into each of the candidate websites using the test login data; and
removing the one of the one or more candidate websites from the one or more candidate websites, in response to detecting a failed automatic login of one of the one or more candidate websites.

15. The method of claim 13, wherein displaying a user interface comprising one or more candidate websites further comprises:
determining a location of the user; and
selecting the one or more candidate websites based on the location of the user.

16. The method of claim 12, wherein accessing a second instance of the website in a headless browser further comprises:
executing the headless browser in a protected environment.

* * * * *